United States Patent [19]

Koike et al.

[11] 4,246,425
[45] Jan. 20, 1981

[54] 4-CHLORO-3,5-DIAMINOPHENYL ACETATES AND CURING AGENT

[75] Inventors: Wataro Koike, Shizuoka; Masami Takayama, Shimizu; Hideaki Ohashi, Fujieda; Chihiro Yazawa, Yokohama, all of Japan

[73] Assignee: Ihara Chemical Industry Co., Limited, Tokyo, Japan

[21] Appl. No.: 18,613

[22] Filed: Mar. 8, 1979

[30] Foreign Application Priority Data

Mar. 23, 1978 [JP]  Japan ................... 53-33518

[51] Int. Cl.³ .................. C07C 101/44; C08G 18/32
[52] U.S. Cl. .............................. 560/47; 528/85; 560/22
[58] Field of Search ........................... 560/47

[56] References Cited

U.S. PATENT DOCUMENTS 3,681,290  8/1972  Meckel et al. .............. 560/47
3,736,350  5/1973  Meckel et al. .............. 560/47

FOREIGN PATENT DOCUMENTS 1220310  1/1971  United Kingdom .............. 560/47

Primary Examiner—Natalie Trousof
Assistant Examiner—G. T. Breitenstein
Attorney, Agent, or Firm—Oblon, Fisher, Spivak, McClelland & Maier

[57] ABSTRACT

4-Chloro-3,5-diaminophenyl acetates having the formula

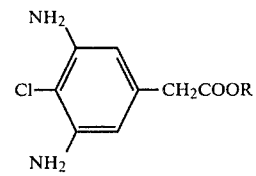

wherein R represents an alkyl group are useful as curing agent for polyurethane elastomer and intermediates for pharmaceutical and agrochemical compounds and are produced by simultaneously nitrating hydrolyzing 4-chlorobenzylcyanide and esterifying the resulting 4-chloro-3,5-dinitrophenyl acetic acid and then reducing the resulting ester.

1 Claim, No Drawings

4-CHLORO-3,5-DIAMINOPHENYL ACETATES AND CURING AGENT

BACKGROUND OF THE INVENTION

1. Field of the Invention

The present invention relates to 4-chloro-3,5-diaminophenyl acetates, preparations thereof and curing agents for polyurethane elastomer using the same compound.

2. Description of the Prior Art

It has been well known that aromatic diamines are used as curing agents for polyurethane elastomer. Various aromatic diamines have been proposed. However, various characteristics have been required for curing agents used for polyurethane elastomer and satisfactory aromatic diamines could not be obtained. The characteristics required for curing agent include (1) low melting solid or liquid from the viewpoint of processability and labour hygiene and saving of energy;

(2) suitable pot-life as a time from mixing the curing agent with a mixture of polyisocyanate and polyol or a prepolymer having terminal isocyanato group to lose fluidity in a casting, from the viewpoint of processability;

(3) suitable set time as a demoldable time from pouring the mixture to taking out the casted product from the viewpoint of processability especially efficiency;

(4) easy synthesis and stability of the object curing agent; and (5) formation of a cured polyurethane elastomer having excellent mechanical characteristics.

These characteristics are inconsistant each other, for example, a trouble of processing is caused by a short pot-life when a short set time is expected. It has been difficult to obtain a curing agent having suitable balance for satisfying these required characteristics.

For example, 3,3'-dichloro-4,4'-diaminodiphenyl methane is a curing agent for polyurethane elastomer having excellent mechanical characteristics, however, it has high melting point (100° to 106° C.) whereby the processability is disadvantageously inferior.

It has been known that 4-chloro-3,5-diaminobenzoates are curing agents for polyurethane elastomer having excellent mechanical characteristics which has long pot-life but the set time disadvantageously is long and a melting point is mostly high. (Japanese Patent Publication No. 51959/1972).

The inventors have studied to obtain a curing agent which has the satisfactory characteristics required for the curing agent for polyurethane elastomer and have synthesized many compounds.

SUMMARY OF THE INVENTION

It is an object of the present invention to provide novel compounds which are useful as a curing agent for polyurethane elastomer and an intermediate for pharmaceutical and agrochemical compound.

It is another object of the present invention to provide a curing agent for polyurethane elastomer which has low melting point, long pot-life, short set time, stable and which is easily synthesized and which gives a cured polyurethane elastomer having excellent mechanical characteristics.

The novel compounds of the present invention are 4-chloro-3,5-diaminophenyl acetates having the formula

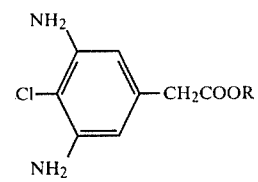

wherein R represents an alkyl group.

DETAILED DESCRIPTION OF THE PREFERRED EMBODIMENTS

The novel compounds of 4-chloro-3,5-diaminophenyl acetates include the following compounds:

Compound (1): methyl 4-chloro-3,5-diaminophenyl acetate;

Compound (2): ethyl 4-chloro-3,5-diaminophenyl acetate;

Compound (3): n-propyl 4-chloro-3,5-diaminophenyl acetate;

Compound (4): i-propyl 4-chloro-3,5-diaminophenyl acetate;

Compound (5): n-butyl 4-chloro-3,5-diaminophenyl acetate;

Compound (6): i-butyl 4-chloro-3,5-diamonophenyl acetate;

Compound (7): sec-butyl 4-chloro-3,5-diaminophenyl acetate;

Compound (8): n-octyl 4-chloro-3,5-diaminophenyl acetate.

These compounds have satisfactory characteristics as a curing agent for polyurethane elastomer.

The novel compounds of 4-chloro-3,5-diamonophenyl acetates can be obtained by simultaneously nitrating and hydrolyzing 4-chlorobenzylcyanide and esterifying the resulting 4-chloro-3,5-dinitrophenyl acetate and reducing the resulting 4-chloro-3,5-dinitrophenyl acetate. The reactions are shown as follows.

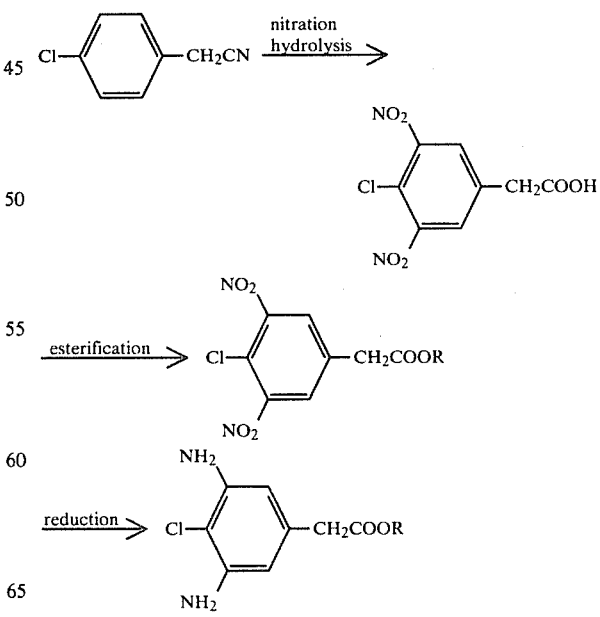

(R : alkyl group).

In the nitration and hydrolysis of 4-chlorobenzylcyanide, 4-chloro-benzylcyanide is mixed with 5 to 20 molar times, preferably 7 to 15 molar times of 95 to 98% sulfuric acid at lower than 30° C. and 2.5 to 4 molar times of 60 to 99% nitric acid is added at 20° to 40° C. and a reaction is performed at 20° to 40° C. for 0.5 to 2 hours and at 50° to 70° C. for 5 to 9 hours. After the reaction, the resulting reaction mixture is poured into water and the precipitated crystals are filtered to obtain 4-chloro-3,5-dinitrophenyl acetic acid in high yield.

The esterification of 4-chloro-3,5-dinitrophenyl acetic acid is performed by reacting with an aliphatic alcohol in the presence of an acid catalyst or in the presence of an acid catalyst and an azeotropic solvent.

Suitable acid catalysts are inorganic or organic acids used in esterification of an acid and an alcohol such as hydrochloric acid, sulfuric acid and p-toluenesulfonic acid, etc.

Suitable azeotropic solvents are solvents to form azeotropic mixtures with the aliphatic alcohol used in the reaction and water formed by the reaction, such as carbon tetrachloride, benzene, toluene, xylene and cyclohexane.

The reaction temperature is usually in a range of 50° to 150° C. preferably a refluxing temperature of the reaction mixture and the reaction time is in a range of 2 to 15 hours.

In the esterification of 4-chloro-3,5-dinitrophenyl acetic acid, 4-chloro-3,5-dinitrophenyl acetic acid is reacted with a chlorinating agent such as phosphorus pentachloride and thionyl chloride and the resulting 4-chloro-3,5-dinitrophenyl acetic chloride is reacted with an aliphatic alcohol in the presence of dehydrogen chloride agent in the absence of a solvent or in an inert solvent.

Suitable inert solvents include carbon tetrachloride, benzene, toluene and xylene.

Suitable dehydrogen chloride agents include organic tertiary amines and inorganic bases such as triethylamine, pyridine, sodium hydroxide, potassium hydroxide and sodium carbonate.

The reaction temperature is in a range of 0° to 150° C. and the reaction time is in a range of 1 to 6 hours.

Suitable aliphatic alcohols used in the esterification of 4-chloro-3,5-dinitrophenyl acetic acid include methanol, ethanol, n- or i-propanol, n-, i- or sec-butanol, n- or i-amyl alcohol, n-hexyl alcohol and n-octyl alcohol.

After the esterification, the resulting reaction mixture is treated by a conventional purification to obtain 4-chloro-3,5-dinitrophenyl acetate in high yield.

In the reduction of 4-chloro-3,5-dinitrophenyl acetate, various reduction such as reduction with iron in the presence of a catalytic amount of an acid, such as hydrochloric acid, sulfuric acid or acetic acid; reduction with tin or tin chloride and conc. hydrochloric acid; and reduction with hydrogen in the presence of a catalyst such as Pt, Ni or Pd.

For example, in the reduction with iron in the presence of a catalytic amount of an acid, a solution of 4-chloro-3,5-dinitrophenyl acetate in a solvent such as benzene, toluene and xylene is added to a mixture of iron powder, an acid, water and a solvent such as benzene, toluene and xylene and the reaction is performed by refluxing for 1 to 10 hours. After the reaction, the reaction mixture is treated by a conventional purification to obtain 4-chloro-3,5-diaminophenyl acetates in high yield.

In the process for producing polyurethane elastomer using the curing agent of the novel compound of 4-chloro-3,5-diaminophenyl acetate of the present invention, the curing agent is heat-melted and admixed with a heated reaction mixture of a polyisocyanate and a polyol or a prepolymer having terminal isocyanato group or a polyisocyanate is admixed with a mixture of a polyol and the curing agent. The mixture is thoroughly mixed and poured into a mold to cure it.

Suitable polyisocyanates include hexamethylenediisocyanate (HMDI), cyclohexanediisocyanate, 2,4-tolylenediisocyanate (2,4-TDI), 2,6-tolylenediisocyanate (2,6-TDI) and mixture of 2,4-tolylenediisocyanate and 2,6-tolylenediisocyanate, dimer and trimer of 2,4-tolylenediisocyanate, xylylenediisocyanate (XDI), meta-xylylenediisocyanate (MXDI), m-phenylenediisocyanate, 4,4'-biphenyldiisocyanate, diphenylehter-4,4'-diisocyanate, 3,3'-ditoluene-4,4'-diisocyanate (TODI), dianisidinediisocyanate (DADI), 4,4'-diphenylmethanediisocyanate (MDI), 3,3'-dimethyl-4,4'-diphenylmethanediisocyanate, 1,5-naphthalenediisocyanate (NDI) and triphenylmethanetriisocyanate (TTI) and desired polyisocyanate used in preparations of polyurethane elastomers can be used.

Suitable polyols include polyols having a molecular weight of 500 to 8,000 and two or more hydroxyl groups such as aliphatic polyester glycols obtained by condensing an aliphatic glycol and a dicarboxylic acid and chain-extending it such as polyethyleneadipate, polybutyleneadipate and polypropyleneadipate; polyalkyleneether glycols obtained by a ring-opening polymerization of ethyleneoxide, propyleneoxide or tetrahydrofuran such as polypropyleneetherglycol and tetramethyleneether glycol; polyesterglycols obtained by a ring-opening polymerization of ε-caprolactone; terminal hydroxylated polybutadiene; alkyleneoxide copolymers; copolyesters of glycol and a dicarboxylic acid; polyesterpolyols as copolyesters of long chain diols of mixture of aromatic glycols or a mixture of polyol e.g. glycerin and trimethylolpropane and an aliphatic glycol and a dicarboxylic acid; and polyetherpolyols obtained by a ring-opening polymerization of ethyleneoxide, propyleneoxide or tetrahydrofuran with an initiator of a polyol such as glycerin and trimethylolpropane.

Suitable urethaneprepolymers having terminal isocyanates are obtained by reacting said polyol with excess of said polyisocyante such as prepolymers having terminal isocyanate group derived from a polyether or a polyesterglycol; such as prepolymers obtained by reacting polytetramethyleneglycol with excess of tolylenediisocyanate; prepolymers obtained by reacting polyethyleneadipate with excess of tolylenediisocyanate, prepolymers obtained by reacting polycaprolactonediol with excess of tolylenediisocyanate.

A ratio of the curing agent of 4-chloro-3,5-diaminophenyl acetate of the present invention is depending upon a polyol, a polyisocyanate or a prepolymer having terminal isocyanate group and it is usually in a range of about 0.8 to 1.2 preferably 0.80 to 1.0 equivalent of amino group of the curing agent or a total of amino group of the curing agent and hydroxyl group of the polyol per 1 equivalent of the isocyanate group.

A ratio of hydroxyl group of the polyol to the amino group of the curing agent can be varied in broad range and preferably in a range of 0.5 to 5 equivalent of hydroxyl group per 1 equivalent of the amino group.

The curing agents of the present invention are solids having a low melting point whereby the processability is highly improved in comparison with the use of the conventional curing agent and polyurethane elastomers having excellent mechanical characteristics can be advantageously obtained.

The present invention will be further illustrated by certain examples and references which are provided for purposes of illustration only and are not intended to be limiting the present invention.

EXAMPLE 1

Preparation of Compound No. 1

In a 1 liter flask equipped with a thermometer, a condenser, a dropping funnel and a stirrer, 250 ml of 97% sulfuric acid (4.55 mole) was charged and 75.8 g (0.5 mole) of 4-chlorobenzylcyanide was added dropwise and a mixed acid of 77 ml of 99% nitric acid (1.84 mole) and 200 ml of 97% sulfuric acid (3.64 mole) was added dropwise during 2 hours.

After the addition, the reaction was performed at 30° C. for 1 hour and then, at 60° C. for 7 hours. After the reaction, the resulting reaction mixture was poured into 2 liters of ice water and a precipitated crystal was separated by a filtration and washed with water and dried to obtain 124.0 g of pale yellow powdery crystals having a melting point of 167.5° to 172.0° C. of 4-chloro-3,5-dinitrophenyl acetic acid (95.2% of yield based on 4-chlorobenzylcyanide).

In a 500 ml flask, 192.0 g (6.0 mole) of methanol, 5 g of conc. sulfuric acid (0.05 mole) and 78.2 g (0.3 mole) of 4-chloro-3,5-dinitrophenyl acetic acid were charged and they were refluxed for 6 hours to react them. After the reaction, the reaction mixture was poured into 2 liters of water and the precipitated crystal was separated by a filtration and washed with water and dried to obtain 75.0 g of pale yellow needle-like crystal having a melting point of 80.0° to 81.5° C. of 4-chloro-3,5-dinitrophenyl acetic acid (91.0% of yield based on 4-chloro-3,5-dinitrophenyl acetic acid).

In a 1 liter flask, 174 g (3.12 mole) of iron powder, 3.0 g (0.05 mole) of acetic acid, 170 g (9.4 mole) of water and 300 ml of toluene were charged, and a solution of 68.6 g (0.25 mole) of methyl 4-chloro-3,5-dinitrophenyl acetate in 100 ml of toluene was added dropwise during about 1 hour to the mixture under refluxing with stirring, and the mixture was refluxed for 3 hours to react them. After the reaction, sodium bicarbonate was added to neutralize acetic acid and the resulting reaction mixture was filtered in hot to separate iron sludge and then, water phase was separated from the resulting filtrate and toluene was distilled off from the organic phase to obtain crystal and the crystal was recrystallized from a mixed solvent of toluene-n-hexane to obtain 44.0 g of methyl 4-chloro-3,5-diaminophenyl acetate Compound No. 1 (82.0% of yield based on methyl 4-chloro-3,5-dinitrophenyl acetate).

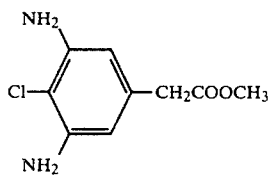

Appearance: Pale yellow needle-like crystal.
Yield: 71.0% (based on 4-chlorobenzyl cyanide: starting material).

Melting point: 59.5° to 61.0° C.
Characteristic IR spectrum:
NH$_2$: 3,430 cm$^{-1}$, 3,350 cm$^{-1}$,
C=O: 1,720 cm$^{-1}$.
The compound was also identified by NMR.

EXAMPLE 2

Preparation of Compound No. 2

In accordance with the process of Example 1 except using ethanol and ethyl 4-chloro-3,5-dinitrophenyl acetate instead of methanol and methyl 4-chloro-3,5-dinitrophenyl acetate, the reaction was carried out to obtain ethyl 4-chloro-3,5-diaminophenyl acetate. The results are shown in Table 1.

EXAMPLES 3 to 7

In accordance with the process of Example 1 except using various aliphatic alcohol, 150 ml of toluene instead of methanol; and using various 4-chloro-3,5-dinitrophenyl acetate instead of methyl 4-chloro-3,5-dinitrophenyl acetate, the reactions were carried out to obtain various 4-chloro-3,5-diaminophenyl acetates. The results are shown in Table 1.

TABLE 1

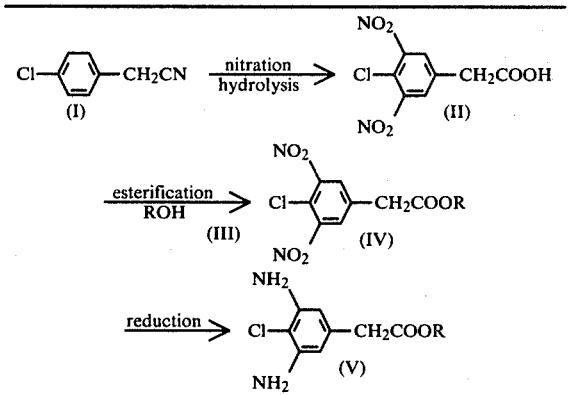

| Ex. | Alcohol (III) | Intermediate (IV) —R | Product (V) —R |
|---|---|---|---|
| 2 | C$_2$H$_5$OH | —C$_2$H$_5$ | Compound No. 2 —C$_2$H$_5$ |
| 3 | n-C$_3$H$_7$OH | -n-C$_3$H$_7$ | Compound No. 3 -n-C$_3$H$_7$ |
| 4 | i-C$_3$H$_7$OH | -i-C$_3$H$_7$ | Compound No. 4 -i-C$_3$H$_7$ |
| 5 | n-C$_4$H$_9$OH | -n-C$_4$H$_9$ | Compound No. 5 -n-C$_4$H$_9$ |
| 6 | i-C$_4$H$_9$OH | -i-C$_4$H$_9$ | Compound No. 6 -i-C$_4$H$_9$ |
| 7 | sec-C$_4$H$_9$OH | -sec-C$_4$H$_9$ | Compound No. 7 -sec-C$_4$H$_9$ |

| Ex. | Yield (%) | Appearance physical property | Characteristic IR spectrum |
|---|---|---|---|
| 2 | 76.3 | yellowish brown prism m.p.67.0–68.5° C. | NH$_2$: 3430cm$^{-1}$; 3350cm$^{-1}$ C=O: 1720cm$^{-1}$ |
| 3 | 70.5 | pale yellow needle-like m.p.43.0–43.5° C. | NH$_2$: 3430cm$^{-1}$; 3350cm$^{-1}$ C=O: 1720cm$^{-1}$ |
| 4 | 76.9 | yellowish brown bulk m.p.77.5–80.0° C. | NH$_2$: 3430cm$^{-1}$; 3350cm$^{-1}$ C=O: 1720cm$^{-1}$ |
| 5 | 80.0 | yellowish brown bulk m.p.39.0–40.0° C. | NH$_2$: 3430cm$^{-1}$; 3350cm$^{-1}$ C=O: 1720cm$^{-1}$ |
| 6 | 77.4 | yellowish brown bulk m.p.41.5–43.0° C. | NH$_2$: 3430cm$^{-1}$; 3350cm$^{-1}$ C=O: 1720cm$^{-1}$ |

TABLE 1-continued

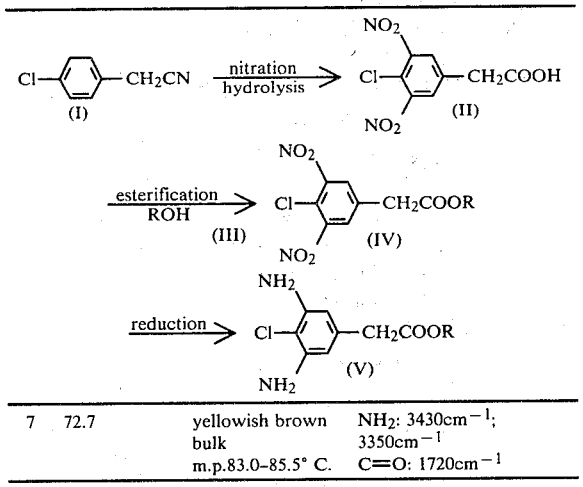

| | | | |
|---|---|---|---|
| 7 | 72.7 | yellowish brown bulk m.p.83.0–85.5° C. | NH$_2$: 3430cm$^{-1}$; 3350cm$^{-1}$ C=O: 1720cm$^{-1}$ |

EXAMPLE 8

The compound No. 1 of methyl 4-chloro-3,5-diaminophenyl acetate was used as a curing agent. 10.2 Gram of the compound No. 1 was melted and mixed with 100 g of a prepolymer obtained from polytetramethyleneglycol and tolylenediisocyanate (Adiplene L-100 manufactured by Du Pont) (4.19 wt.% of isocyanato group) at 90° C. with stirring for about 60 seconds. The mixture was poured into a mold having a size of 100 mm×250 mm×2 mm heated at 100° C. and it was cured at 100° C. for 1 hour and it was demolded and then, heated at 100° C. for 15 hours to perform an after-curing. The resulting polyurethane elastomer was aged at 25° C. in a relative humidity of 50% for 7 days and characteristics of the polyurethane elastomer were measured by Japanese Industrial Standard K 6301. The results are shown in Table 2.

EXAMPLES 9 to 14

In accordance with the process of Example 8 except using various 4-chloro-3,5-diaminophenyl acetates as the curing agent, polyurethane elastomers were prepared and characteristics of polyurethane elastomers were measured. The results are shown in Table 2.

EXAMPLE 15

7.3 Gram of methyl 4-chloro-3,5-diaminophenyl acetate as a curing agent was melted and mixed with 100 g of a prepolymer obtained from polyethyleneadipate and tolylenediisocyanate (Cyaprene A 8 manufactured by ACC) (3.0 wt.% of isocyanato groups) at 90° C. with stirring for about 60 seconds. The mixture was poured into a mold having a size of 100 mm×250 mm×2 mm heated at 100° C. and it was cured at 100° C. for 1 hour and it was demolded and then, heated at 100° C. for 15 hours to perform an after-curing. The resulting polyurethane elastomer was aged at 25° C. in a relative humidity of 50% for 7 days and characteristics of the polyurethane elastomer were measured by Japanese Industrial Standard K 6301. The results are shown in Table 2.

EXAMPLES 16 to 21

In accordance with the process of Example 15 except using various 4-chloro-3,5-diaminophenyl acetates as the curing agent, polyurethane elastomers were prepared and characteristics of polyurethane elastomers were measured. The results are shown in Table 2.

TABLE 2

| Example | 8 | 9 | 10 | 11 | 12 | 13 | 14 |
|---|---|---|---|---|---|---|---|
| Curing agent Compound No. | No.1 | No.2 | No.3 | No.4 | No.5 | No.6 | No.7 |
| Amount of curing agent (g) | 10.2 | 10.8 | 11.5 | 11.5 | 12.2 | 12.2 | 12.2 |
| Equivalent ratio of NH$_2$/NCO | 0.95 | 0.95 | 0.95 | 0.95 | 0.95 | 0.95 | 0.95 |
| Pot-life (min.) | 11 | 11 | 12 | 12 | 11 | 12 | 12 |
| Set time (min.) | 30 | 30 | 30 | 30 | 30 | 30 | 30 |
| Physical Properties | | | | | | | |
| Hardness(Shore-A) | 95 | 94 | 94 | 94 | 94 | 94 | 94 |
| 100% modulus (Kg/cm$^2$) | 101 | 98 | 97 | 103 | 105 | 96 | 107 |
| 300% modulus (Kg/cm$^2$) | 147 | 134 | 147 | 168 | 135 | 128 | 144 |
| Tensile strength (Kg/cm$^2$) | 342 | 336 | 319 | 371 | 302 | 305 | 354 |
| Elongation (%) | 480 | 500 | 460 | 460 | 470 | 500 | 460 |
| Tear strength (Kg/cm) | 101 | 98 | 92 | 105 | 91 | 98 | 93 |
| Rebound elasticity (%) | 59 | 59 | 58 | 60 | 59 | 57 | 59 |
| Compression permanent set (%) | 32 | 34 | 30 | 35 | 37 | 37 | 32 |
| Example | 15 | 16 | 17 | 18 | 19 | 20 | 21 |
| Curing agent Compound No. | No.1 | No.2 | No.3 | No.4 | No.5 | No.6 | No.7 |
| Amount of curing agent (g) | 7.3 | 7.8 | 8.2 | 8.2 | 8.7 | 8.7 | 8.7 |
| Equivalent ratio of NH$_2$/NCO | 0.95 | 0.95 | 0.95 | 0.95 | 0.95 | 0.95 | 0.95 |
| Pot-life (min.) | 11 | 11 | 12 | 12 | 11 | 12 | 12 |
| Set time (min.) | 30 | 30 | 30 | 30 | 30 | 30 | 30 |
| Physical Properties | | | | | | | |
| Hardness (Shore-A) | 90 | 90 | 90 | 90 | 90 | 89 | 89 |
| 100% modulus (Kg/cm$^2$) | 57 | 58 | 57 | 58 | 56 | 54 | 55 |
| 300% modulus (Kg/cm$^2$) | 78 | 81 | 82 | 80 | 79 | 77 | 77 |
| Tensile strength (Kg/cm$^2$) | 578 | 533 | 540 | 563 | 495 | 460 | 479 |
| Elongation (%) | 710 | 700 | 770 | 730 | 760 | 750 | 740 |
| Tear strength (Kg/cm) | 97 | 94 | 99 | 98 | 92 | 90 | 93 |
| Rebound elasticity (%) | 54 | 53 | 53 | 53 | 51 | 51 | 50 |
| Compression permanent set (%) | 40 | 41 | 43 | 41 | 43 | 46 | 45 |

What is claimed is:

1. 4-Chloro-3,5-diaminophenyl acetates having the formula

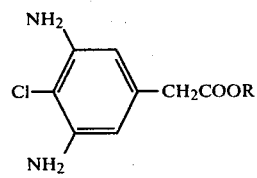

wherein R represents a C$_1$ to C$_8$ alkyl group.